US012142293B2

(12) United States Patent
Sharma et al.

(10) Patent No.: US 12,142,293 B2
(45) Date of Patent: Nov. 12, 2024

(54) SPEECH DIALOG SYSTEM AND RECIPIROCITY ENFORCED NEURAL RELATIVE TRANSFER FUNCTION ESTIMATOR

(71) Applicant: NUANCE COMMUNICATIONS, INC., Burlington, MA (US)

(72) Inventors: Dushyant Sharma, Mountain House, CA (US); Patrick Naylor, Reading (GB); Daniel T. Jones, London (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 203 days.

(21) Appl. No.: 17/855,554

(22) Filed: Jun. 30, 2022

(65) Prior Publication Data

US 2024/0005946 A1 Jan. 4, 2024

(51) Int. Cl.
*G10L 25/78* (2013.01)
*G10L 19/02* (2013.01)
*G10L 25/30* (2013.01)

(52) U.S. Cl.
CPC .............. *G10L 25/78* (2013.01); *G10L 19/02* (2013.01); *G10L 25/30* (2013.01)

(58) Field of Classification Search
CPC ......... G10L 25/78; G10L 19/02; G10L 25/30; G10L 2021/02166; G10L 19/008
See application file for complete search history.

(56) References Cited

U.S. PATENT DOCUMENTS

| | | | | |
|---|---|---|---|---|
| 2017/0053644 | A1* | 2/2017 | Rennie | G10L 15/063 |
| 2020/0050926 | A1* | 2/2020 | Morcos | G06F 17/16 |
| 2021/0103768 | A1* | 4/2021 | Niculescu-Mizil | G06N 7/01 |
| 2023/0386437 | A1* | 11/2023 | Wang | G06N 3/045 |

OTHER PUBLICATIONS

Drude, Lukas et al.; "Multi-channel Opus compression for far-field automatic speech recognition with a fixed bitrate budget"; Interspeech 2021, 2021, pp. 1669-1673.

(Continued)

*Primary Examiner* — Bhavesh M Mehta
*Assistant Examiner* — Darioush Agahi
(74) *Attorney, Agent, or Firm* — Barta Jones, PLLC

(57) ABSTRACT

There is provided a speech processing system that includes a neural encoder module. A processor that receives an audio signal; and the memory that contains instructions that control said processor to perform operations that process speech. In an implementation, a front end module can include a Neural Spatial RTF Estimator and a neural spatial and residual encoder (NSRE) configured accept as inputs a spectral encoded reference channel stream to output Neural Transfer Functions (NTFs). In another implementation, a front end module encodes and outputs a Ch1 bitstream; computes a plurality of relative transfer functions (RTFs) for an N-Channel signal and outputs an N−1 RTFs or an RTF codebook ids and computes and processes an N−1 residual stream; and a back end module comprising a neural encoder module configured to accept the RTFs and output an encoded speech signal comprising an embedding that comprises features extracted from RTFs. There is also provided a speech processing system that includes a Relative Transfer Function Estimator Module.

20 Claims, 11 Drawing Sheets

(56) References Cited

OTHER PUBLICATIONS

Jones, Daniel T et al.; "Spatial Coding for Microphone Arrays using IPNLMS-Based RTF Estimation"; 2021, IEEE Workshop on Applications of Signal Processing to Audio and Acoustics, 5 pages.
"RTF's, Inter-channel Mapping, Reciprocity, Graphs and fun with maths"; Sep. 2021, 3 pages.
Zeghidour, Neil et al.; "SoundStream: An End-to_end Neural Audio Codec"; Jul. 7, 2021, 12 pages.

* cited by examiner

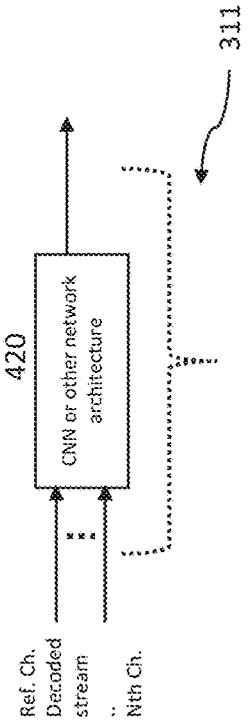
FIG. 4B
FIG. 4C
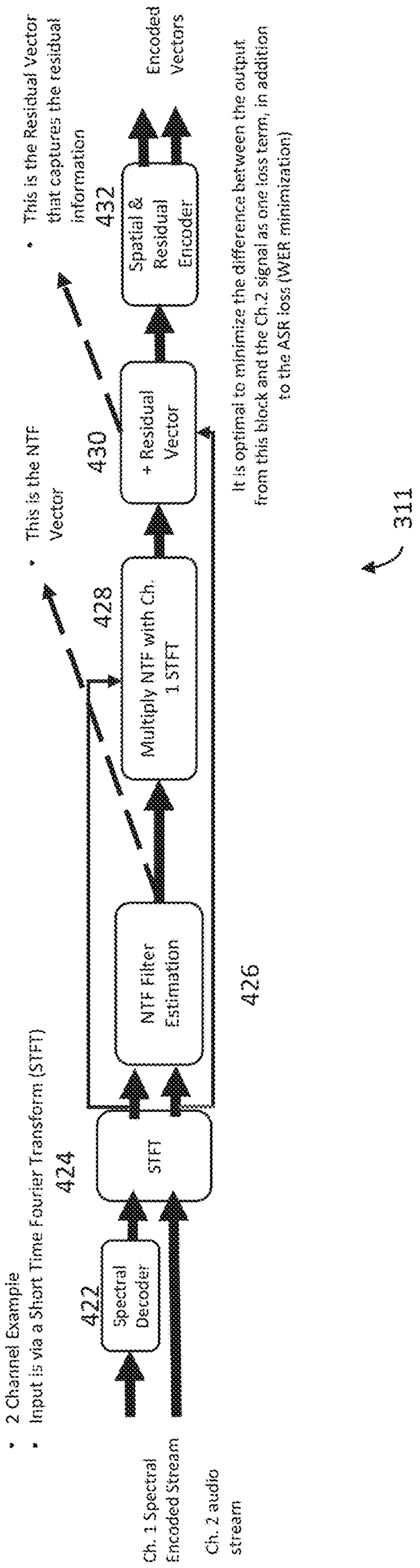

SPEECH DIALOG SYSTEM AND RECIPIROCITY ENFORCED NEURAL RELATIVE TRANSFER FUNCTION ESTIMATOR

BACKGROUND OF THE DISCLOSURE

1. Field of the Disclosure

The present disclosure relates to speech processing, and more specifically, speech processing systems and methods including a neural encoder.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Multi-microphone speech applications often need interaction between different components, such as a Front End (FE) module, an automatic speech recognition (ASR) module, and a speech dialog (SD) module. These components are typically integrated in a framework application that controls interactions between these components. In current systems, typically:

(a) The FE performs multi-channel signal based audio coding to provide an output signal. Multi-channel speech enhancement may include acoustic echo cancellation, noise reduction and spatial filtering such as beamforming, speech signal separation or cross-talk cancellation. The FE typically provides one single output signal for the ASR, but the speech enhancement might be a multiple-input multiple-output system with more than one output. The output signal is typically sent in subsequent blocks with, for example, a block length of 16 milliseconds (ms). The FE comprises a signal based, multi channel audio coding. In an implementation, the audio coding can include compression of the multi channel audio signal, which can advantageously preserve transmission bandwidth.

(b) The ASR attempts to detect and recognize speech utterances, e.g., a wake-up-word (WuW) or a sequence of spoken words, based on the input signal, thus yielding a recognition result.

In current systems, the multi-channel signals are beneficial, and this requires the transmission of the multi microphone signals to the processing system, which may be in the cloud. One way to mitigate the high bandwidth requirement for this is to compress the audio on the edge and then decompress in the cloud and then run the spatial front-end, which typically outputs a single channel audio signal for ASR.

SUMMARY OF THE DISCLOSURE

A technical problem addressed by the present disclosure is that cloud processing of multi-channel audio speech signals presents bandwidth challenges. A technical solution to this problem provided by the present disclosure employs artificial intelligence to process audio signals and provide them to an ASR.

Disclosed are implementations of technology that advantageously solves the problem of efficiently compressing speech signals from a microphone array into spectral and spatial components and providing those as to an ASR system to perform Distant Speech Recognition. In a far field (distant) ASR scenario, microphone arrays are employed to capture the speech signals, and then to apply spatial signal processing, either standalone or integrated directly into the ASR pipeline, to enhance the audio signal. In conventional systems, the multi-channel microphone signals are transmitted to the processing system, which can be in the cloud.

One way to mitigate the high bandwidth requirement for the multi-channel microphone signals is to compress the audio on the edge, then decompress the audio signals in the cloud, and then run the spatial front-end. The spatial FE typically outputs a single channel audio signal for ASR. Disclosed are implementations that do not require the explicit decompression of the multi-channel audio and works with just one reference microphone channel and Nmic−1 spatial features.

Implementations of the system is advantageously configured to transmit multichannel speech data from deployed microphone array devices with limited computation resources or transmission bandwidth. An exemplary advantage of system is multichannel speech data can be processed in environments where a full ASR system could not run on the deployed devices to a distributed ASR system (e.g.: cloud-based). Moreover, the system is configured so as not to require a spatial enhancement of the front-end multichannel speech data. Instead, implementations provide to the ASR system a set of spectral information from one reference channel and Nmic−1 compressed representations of the spatial information. Implementations as described herein affect a paradigm shift in far field audio systems, where conventional systems try to enhance the audio and create a cleaner 1 channel stream for ASR. Implementations as described herein rely on providing the ASR with one channel of the original audio and Nmic−1 features that capture the spatial 'situation'.

An exemplary advantage of this is that the system does not introduce any artifacts into the original audio and at the same time provides to the ASR all the spatial information that would be necessary to create the multi-channel audios and perform spatial processing. Conventional systems are required to train the ASR backend on new types of spectral and spatial processing since those methods typically introduce their own artifacts in addition to cleaning up acoustic interference.

Implementations as described herein include a number of advantages when compared to current far field systems. Current state of the art (SOTA) systems for far field ASR use some type of spatial and spectral enhancement front-end that take multi microphone signals and output a single channel of enhanced audio for ASR. Providing spatial information as a compressed representation has a number of advantages. For example, the implementations of the system as described herein takes advantage of the geometrical structure of a microphone array to optimize the encoding process from multi-channel audio. By optimizing the word error recognition (WER) in an end-to-end manner, the system provides an efficient method for transporting all the spatial information from the field with a much smaller bandwidth requirement than would be necessary for multiple microphone signals. For example, when optimizing an application (e.g.: ASR), a small amount of spatial information can be retained (e.g: for frequency bands, thus achieving a more efficient compression as opposed to simply trying to perfectly reconstruct the multi channel signal, as is typically done in conventional SOTA applications.

In an implementation, the system does not decode the spatial information to reconstruct the Nmic audio and perform spatial processing to create a single enhanced channel. Instead, the system provides to the ASR front end encoder a reference channel of raw audio feature bit stream and a Nmic−1 feature bit stream as input. The ASR system thereby has the spatial and spectral information to perform recognition, with the advantage of being able to optimize the whole pipeline end to end and without introducing any artifacts typical in the enhancement process.

A framework of reciprocity of the relative transfer function (RTF) extraction provides the spatial information in the system. Such a framework allows the system to place constraints on the learning cost function that mimic the physical acoustic scenario and leads to a much more robust system for spatial information extraction.

As noted above, the current conventional SOTA methods perform spatial processing (beamforming for example) where multi-microphone data is enhanced down to one channel and provided to the ASR. This means the ASR can work in a single channel mode without any spatial information, which for other tasks like speaker diarization would be very valuable. For example, since the system is configured to explicitly provide this information, good gains can be obtained for the triple joint type ASR models that do speaker diarization jointly with ASR.

While the implementations are employed with ASR, this technique can also be applied to other speech processing applications such as, for example, speaker diarization.

BRIEF DESCRIPTION OF THE DRAWINGS

FIGS. 4A-4C are a block diagram of a neural front end.

A component or a feature that is common to more than one drawing is indicated with the same reference number in each of the drawings.

DESCRIPTION OF THE DISCLOSURE

Figure 1:
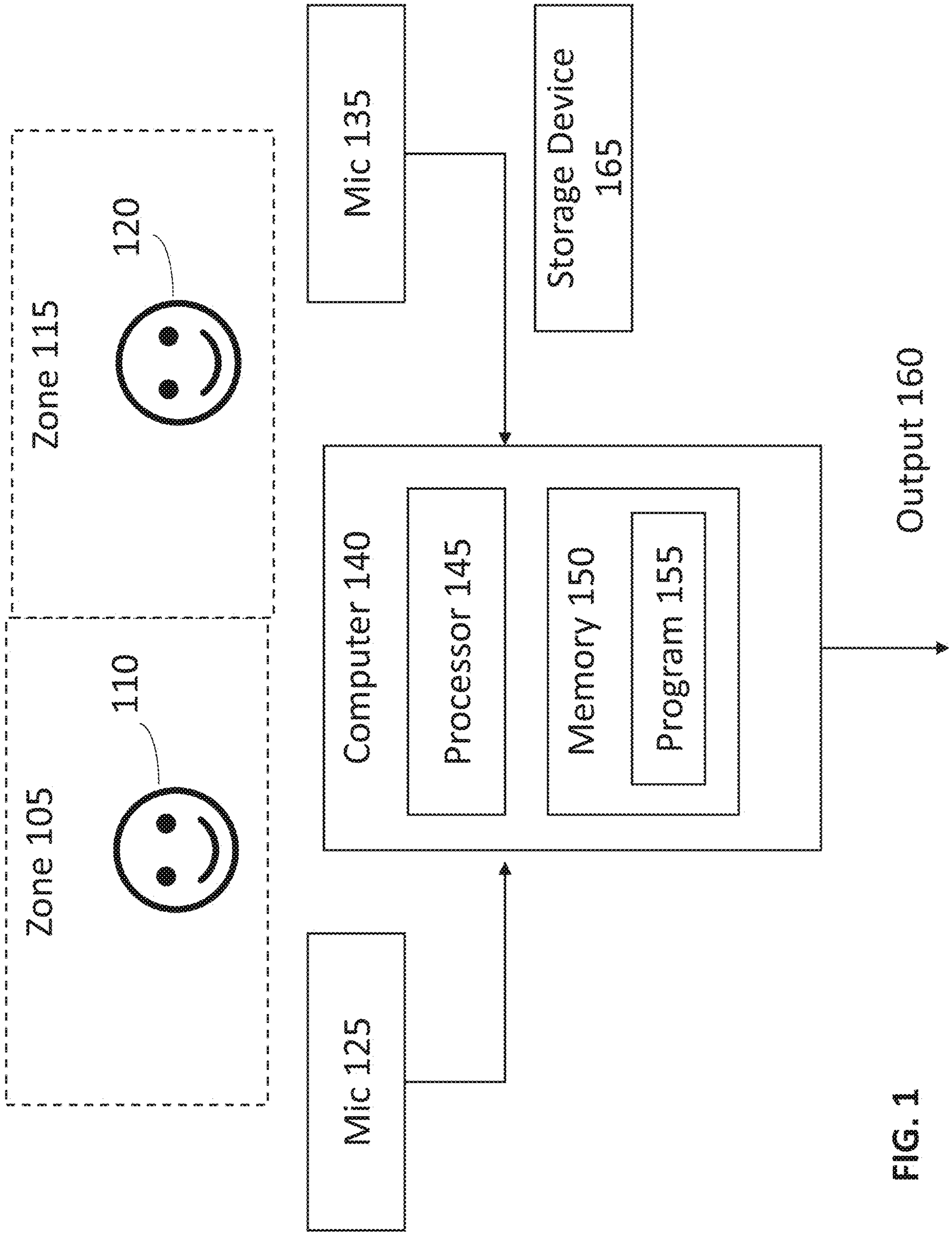
FIG. 1 is block diagram of a multi-microphone speech dialog system.

FIG. 1 is block diagram of a multi-microphone speech dialog system, namely system 100, which can include one or more spatial zones, As shown in FIG. 1, an implementation of the system 100 comprises multiple spatial zones 105 and 115. System 100 includes microphones 125 and 135, and a computer 140. Computer 140 includes a processor 145 and a memory 150. A user 110 is situated in zone 105, and a user 120 is situated in zone 115. As will be appreciated, while an exemplary system with multiple spatial zones are shown, systems can be configured for a single spatial zone, for example, a single spatial zone for an enclosed room.

Microphones 125 and 135 are detectors of audio signals, e.g., speech from users 110 and 120, from zones 105 and 115. Microphone 125 is situated to capture audio from zone 105 at a higher signal level than audio from zone 115, and microphone 135 is situated to capture audio from zone 115 at a higher signal level than from zone 105. In practice, microphone 125 and microphone 135 could be arrays of microphones focused on a particular spatial zone. As will be appreciated, microphones need not be steered or located with certain proximity to acoustic zones, though they can be. In implementations, a plurality of microphones can be a known position relative to each other. For example, in an implementation, microphones can be, for example, omnidirectional and form part of an array which captures audio from a wide range of acoustic angles (i.e. not focused onto any zone) and can be steered via spatial processing (i.e. beamforming) to look in certain directions. Microphones 125 and 135 output their respective detected audio signals in the form of electrical signals to computer 140.

Processor 145 is an electronic device configured of logic circuitry that responds to and executes instructions.

Memory 150 is a tangible, non-transitory, computer-readable storage device encoded with a computer program. In this regard, memory 150 stores data and instructions, i.e., program code, that are readable and executable by processor 145 for controlling operation of processor 145. Memory 150 may be implemented in a random access memory (RAM), a hard drive, a read only memory (ROM), or a combination thereof. One of the components of memory 150 is a program module 155.

Program module 155 contains instructions for controlling processor 145 to execute the methods described herein. For example, under control of program module 155, processor 145 will detect and analyze audio signals from zones 105 and 115, and in particular speech from users 110 and 120, and produce an output 160 based on the analysis.

The term "module" is used herein to denote a functional operation that may be embodied either as a stand-alone component or as an integrated configuration of a plurality of subordinate components. Thus, program module 155 may be implemented as a single module or as a plurality of modules that operate in cooperation with one another. Moreover, although program module 155 is described herein as being installed in memory 150, and therefore being implemented in software, it could be implemented in any of hardware (e.g., electronic circuitry), firmware, software, or a combination thereof.

While program module 155 is indicated as being already loaded into memory 150, it may be configured on a storage device 165 for subsequent loading into memory 150. Storage device 165 is a tangible, non-transitory, computer-readable storage device that stores program module 155 thereon. Examples of storage device 165 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to computer 140 via data communications network (not shown).

In practice, computer 140 and processor 145 will operate on digital signals. As such, if the signals that computer 140 receives from microphones 125 and 135 are analog signals, computer 140 will include one or more analog-to-digital converter(s) (not shown) to convert the analog signals to digital signals.

System 100 includes a microphone 125, a microphone 135, a processor 145 and a memory 150. Microphone 125 captures first audio from zone 105, and produces a first audio signal. Microphone 135 captures second audio from zone 115, and produces a second audio signal. Processor 145 receives the first audio signal and the second audio signal, and memory 150 contains instructions, i.e., program 155, that control processor 145 to perform operations comprising those of a front end module and a back end module as described herein.

Figure 2A:
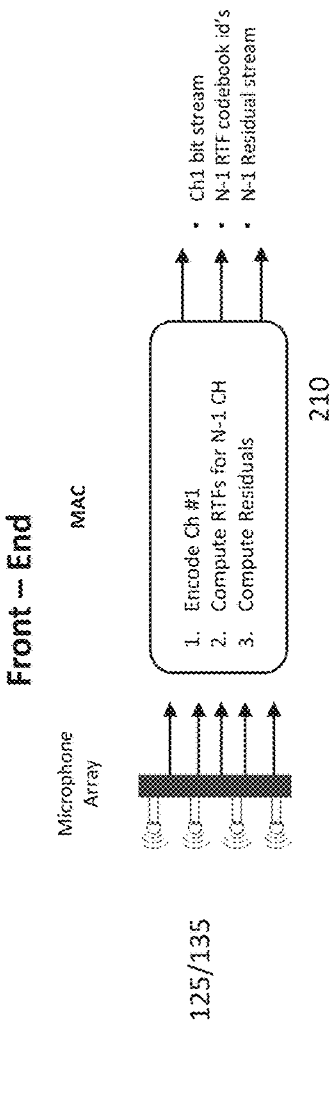
FIGS. 2A-2C are block diagrams of a front end and back end module.
Figure 2B:
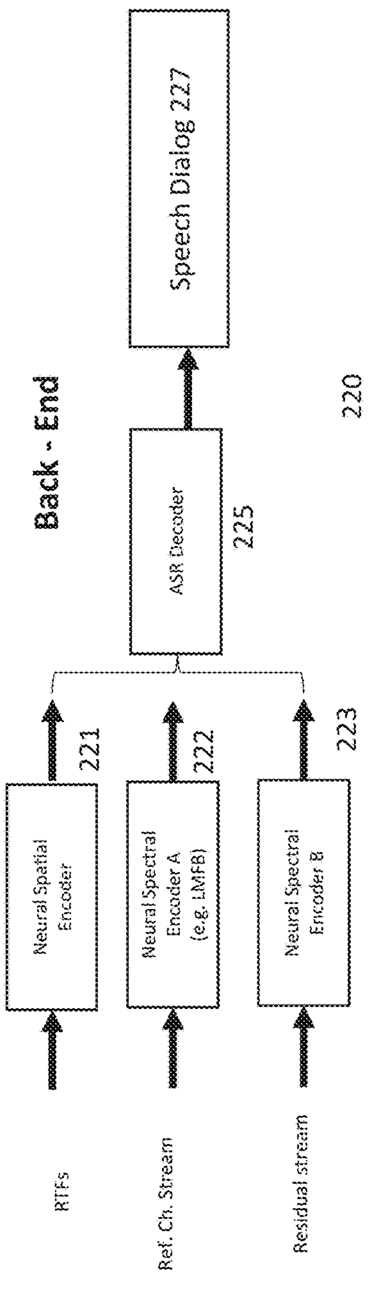
Figure 2C:
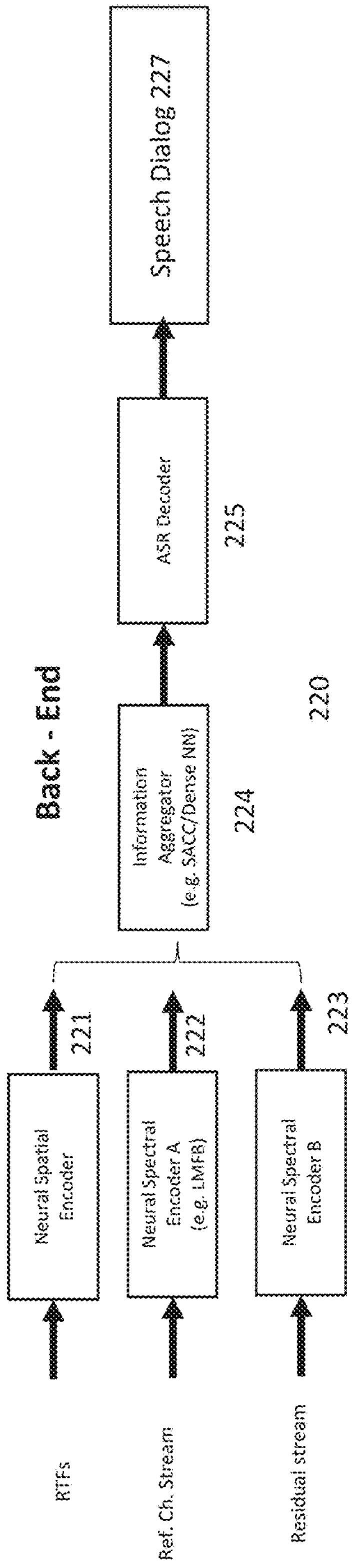

FIGS. 2A-2C are block diagrams of modules that can be implemented in program module 155. Modules include:

(a) an FE module that:
- detects, from the first audio signal and the second audio signal, speech activity in at least one of zone 105 or zone 115;
- encodes and outputs a Ch1 bitstream;
- computes RTFs for a remaining N−1 Channel and outputs an N−1 RTF codebook ids; and computes and processes an N−1 residual stream.

(b) an ASR module that can:
- recognize an utterance in the processed audio, thus yielding a recognized utterance; and
- based on the zone activity information, produce a zone decision that identifies from which of zone 105 or zone 115 the recognized utterance originated; and (c) an SD module that:
- performs speech dialog based on the recognized utterance.

FE 210 receives signals from microphones 125 and 135, and produces a signal, which includes a mixed audio of signals from zones 105 and 115. Thus, FE 210 is configured to generate one audio data output stream, i.e., signal, which is forwarded to ASR 225.

ASR 225 receives the signal and produces a recognition result. Recognition result may consist of a sequence of words that have been recognized based on a signal. Recognition result may also contain confidences that refer to each of the recognized words, indicating how certain a word has been recognized. The ASR can also be configured to estimate an identification a speaker and speaker localization information. The ASR can also be configured for text transcription, for example, to transcribe recognized speech, which can be identified to the speaker.

Speech Dialog 227 receives recognition result and triggers further actions. Those can be wake up words (WuW), subsequent recognitions or calls to the surrounding system. Calls to the surrounding system can, for example, trigger a navigation system feature, play desired music, control an air conditioner or a seat heater, provided to a Natural Language Understanding (NLU), or any other action.

As shown in FIG. 2A, front end 210 receives signals from microphones 125 and 135, and produces a signal, which can include a mixed audio of signals from zones 105 and 115. Front end 210 is configured to generate one audio data output stream, which is forwarded to ASR 225 in the back end 220. The front end 210 module detects the audio signal, speech activity in at least one of zone 105 or zone 115, encodes and outputs a Ch1 bitstream; computes RTFs for an N−1 Channel and outputs an N−1 RTF codebook ids; and computes and processes an N−1 residual stream.

FIG. 2B and FIG. 2C shows implementation of a back end 220 module. At the back end 220, ASR 225 receives the signal and produces a recognition result. Recognition result can consist of a sequence of words that have been recognized based on signal. Recognition result can also contain confidences that refer to each of the recognized words, indicating how certain a word has been recognized.

Speech Dialog 227 receives recognition result, and triggers further actions. Those can be subsequent recognitions or calls to the surrounding system. Calls to the surrounding system may for instance trigger a navigation system feature, play desired music, control an air conditioner or a seat heater or any other action.

In an implementation, the front end 210 module comprises a neural front end 210 composed of a signal based multi-channel system. In the front end, the RTFs, the residuals and Ch 1 (the reference channel) encode the audio signal conventionally. The signal is output to the back-end module 220. In the implementation, the back-end module 220 comprises encoders 221 222, 223, ASR decoder 225 and an Information Aggregator 224.

In an implementation, there are two sets of spatial and spectral encoders.

Type I encoders, which are designed to extract and compress the information.

Type II encoders are designed to de-compress these representations and provide suitable embeddings to the ASR decoder 225.

In another implementation, Type I and Type II encoders can be merged into a single unit.

In an implementation, an edge front end 210 runs a MAC method, detects, audio signals from one or more microphones or microphone arrays, encodes and outputs a Ch1 bitstream; computes RTFs for an N−1 Channel and outputs an N−1 RTF codebook ids; and computes and processes an N−1 residual stream.

In an implementation, the back end module 220 comprises a Neural Spatial Encoder 221, a first Neural Spectral Encoder A 222, a second Neural Spectral Encoder B 223, an Information Aggregator 224, and an ASR decoder 225.

The back end 220 decodes the reference channel (Ch1) and processes the signal speech signal encoder. The RTFs themselves are processed in a separate, trained spatial encoder 221. A third, residuals-based encoder 223 can also be used. The output from these three encoders are weighted and summed to produce an output as an embedding that is input to the ASR decoder 225.

The Neural Spatial Encoder 221: takes as input the RTFs and outputs an embedding, a vector, for use with ASR 225. This Neural Spatial Encoder is trained jointly with the ASR decoder and is thereby configured to learn to extract useful features from the RTFs.

A first Neural Spectral Encoder A 222: takes as input the reference channel audio data stream and encodes an embedding for use with ASR 225. This can be done via known techniques, for example, employing used log-Mel filterbank frequency spectrum features.

A second Neural Spectral Encoder B 223: takes in a residual data stream and encodes an embedding for the ASR 225. This encoder is configured to learn to extract a compact representation for the ASR 225.

In an implementation, the back-end module 220 can include an Information Aggregator 224. The Information Aggregator 224 is configured to generate a weighted sum of the embeddings (spatial, spectral A and spectral B) and output these to the ASR decoder 225.

Figure 3A:
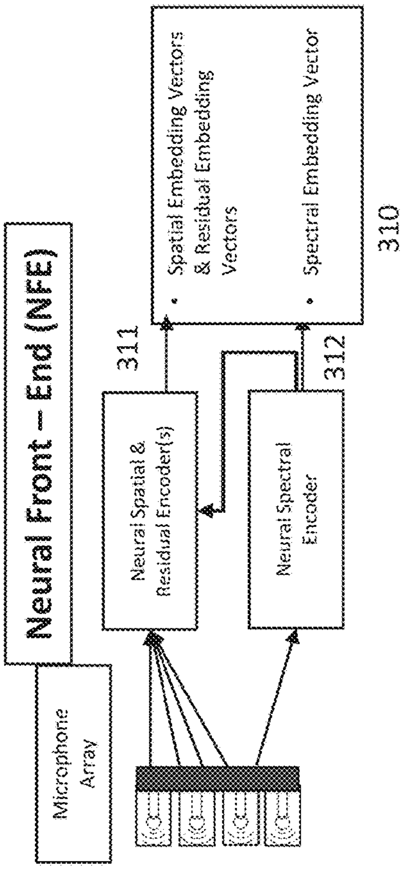
FIGS. 3A-3C are a block diagram of a front end and a back end module.
Figure 3B:
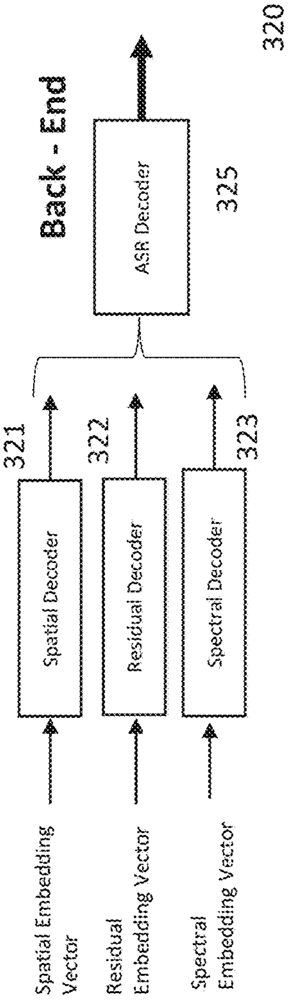
Figure 3C:
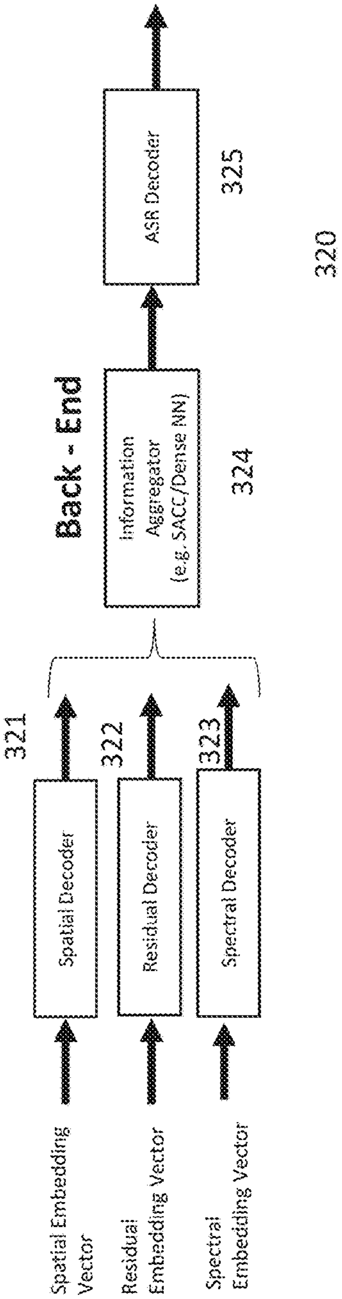

FIGS. 3A-3C show an implementation of a neural front end 310 and neural back end 320.

In the implementation, the neural front-end (NFE) 310 is a fully neural encoder comprising a neural spectral encoder 312 and a module 311 including a neural spatial encoder and neural residual encoder that encodes spatial and spectral information into embeddings, which can be entropy coded and transmitted to the back-end.

The back-end architecture 320 performs the ASR decoding as shown in FIGS. 3B-3C. An additional advantage is that the edge coder has parameters that can be trained to optimize a particular target, such as word error recognition (WER).

In an implementation, the spectral encoder 312 is a neural encoder that encodes the reference channel and outputs a spectral embedding vector. This is then provided as input to the module 311 including the spatial and residual encoders to produce the spatial and residual embedding vectors to the back end module 320. In an implementation, the back-end module 320 includes a set comprising a neural spatial decoder 321, a residual decoder 322 and a spectral decoder 323. Decoders are designed to de-compress these representations and provide suitable embeddings to the ASR decoder 325.

On the back end module 320, in an implementation, the neural spatial decoder 321, a residual decoder 322 and a spectral decoder 323 can be optional. These optional decoders can provide the embeddings to an optional information aggregator 324 and then to the ASR 325. Accordingly, in another implementation, the encoded signals are provided directly to ASR 225 without the need for a decoder (similar to the implementations shown in FIG. 2B and FIG. 2C).

The Neural Spectral Encoder 312 encodes the reference channel signal. The Neural Spectral encoder 312 can be a neural architecture such as a Generative Speech Coding with Predictive Variance Regularization as described in Generative Speech Coding with Predictive Variance Regularization, W. Bastiaan Kleijn and Andrew Storus and Michael Chinen and Tom Denton and Felicia S. C. Lim and Alejandro Luebs and Jan Skoglund and Hengchin Yeh, arXiv:2102.09660 [eess.AS] 2021. The Neural Spectral encoder 312 can also be a neural architecture such as a fully convolutional encoder/decoder network and a residual vector quantizer, which are trained jointly end-to-end as described in SoundStream: An End-to-End Neural Audio Codec, Neil Zeghidour and Alejandro Luebs and Ahmed Omran and Jan Skoglund and Marco Tagliasacchi arXiv:2107.03312v1 [cs.SD], 2021. The Neural Spectral Encoder 312 advantageously optimizes a loss function being optimized for a speech processing target. For example, in the ASR context, the Neural Spectral Encoder 312 optimizes an additional WER loss term.

Figure 4A:
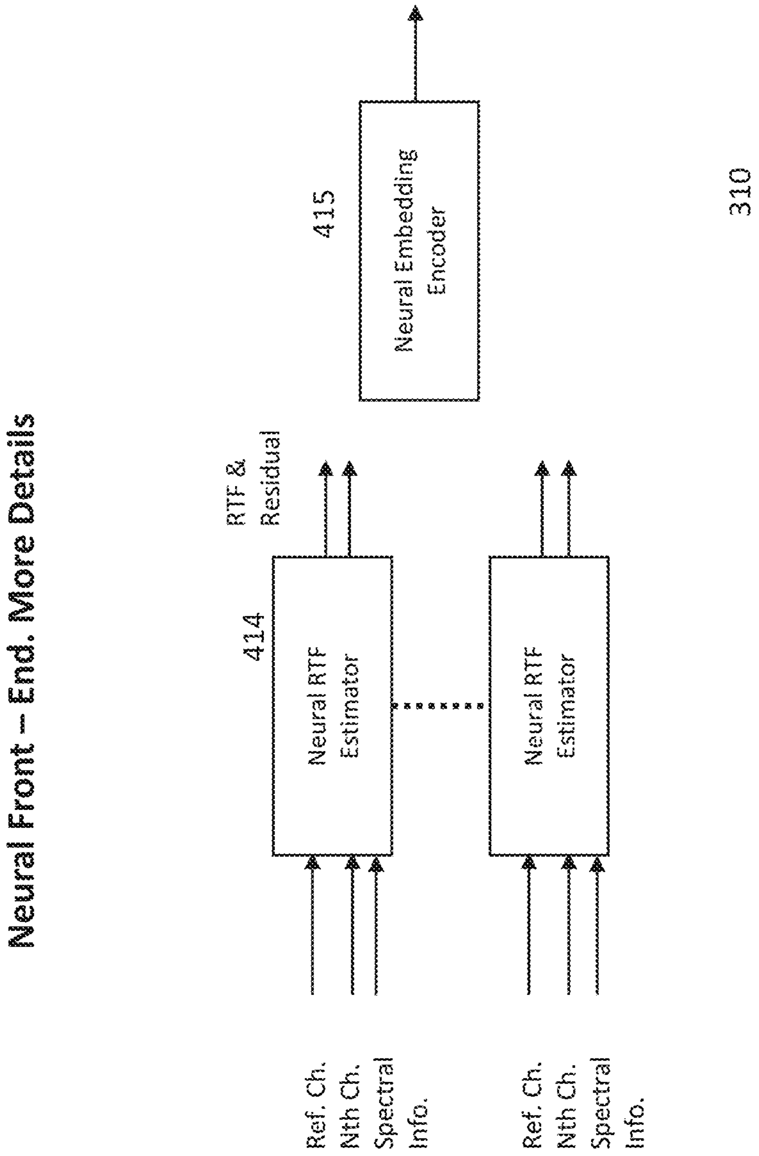

FIGS. 4A-4C shows an implementation of logical processes for neural front end 310. In an implementation, the Neural Spatial Encoder 311 comprises a Neural Spatial RTF Estimator 414. Neural Spatial RTF Estimator 414 is a neural network that estimates a fixed length filter and a residual vector. The loss function is reconstruction of the Nth microphone channel audio from the Reference Channel Convolved (if in time domain or multiply if in frequency domain) with the estimated filter plus the residual vector. If the system is deployed in a very quiet room, a trained neural network will produce a null residual vector.

The output from the front end 310 are three (3) Neural Embeddings that can be further compressed for efficient transmission via entropy coding for example, as is well known in the art, for example, by Entropy coding or Huffman coding.

A Neural Embedding Encoder 415 takes as input the RTFs and Residuals from the Neural Spatial RTF Estimator 414 for all channels and allocates appropriate 'density' to compress the spatial and residual embedding vectors therefrom.

In an implementation, the Neural Spatial and Residual Encoder (NSRE) 311 can be a single neural network that performs the spatial and residual information extraction of multi-channel networks. In an implementation, spatial and residual information extraction is for a collection of two channel networks, each accepting as input the spectral encoding of a reference channel and other microphone channel audio.

Inputs to the NSRE 311 are the reference channel encoded with the spectral encoder (for example, channel no. 1) and all other microphone channels. In an embodiment, the encoded reference embedding stream can be decoded into audio or features before further processing by the NSRE 311. As NSRE 311 is a neural network, in an implementation, the NSRE 311 can be trained to process the encoded spectral information without the need for explicit decoding.

The output of the NSRE 311 are Neural Transfer Functions (NTFs), which are similar to RTFs, however the NTFs do not include an explicit RTF estimation criteria and a set of Residuals. Instead, the RTF estimation criteria and a set of Residuals are encoded into embeddings via a separate Neural Embedding Encoder 415 or within the NSRE 311 itself.

In an implementation, the NSRE 311 comprises the following logical processing for a neural front end 310 as shown in FIGS. 4B-4C.

At block 420, a NSRE 311, for example, a Convolutional Neural Net (CNN) 420 or other neural net architecture, processes an Estimate Finite Impulse Response (FIR) filter, which when convolved with the Ref. Channel decoded stream produces the Nth channel signal plus a residual. This filter is the NTF vector. The residual is a signal that is the difference between the reference channel convolved with the filter and the actual Nth channel signal. In the case of a "perfect" NTF with no background noise, the residual will be null.

FIG. 4C shows a 2 channel example of a neural net process for an NSRE 311. For example, using a 2 channel RIRs (room impulse responses) as an example, at block 422 a channel 1 spectral encoded stream is processed by a spectral decoder and output from the spectral decoder. At block 424, the channel 1 decoded stream and a channel 2 audio stream is processed to transform the set, for example, a frequency domain via a Short Time Fourier Transform (STFT). At block 426 STFT outputs the set to an Estimate FIR filter. This Estimate FIR filter produces the NTF vector. The Estimate FIR filter, when convolved with the Reference Channel decoded stream from block 424, produces the Nth channel signal plus a residual vector. At block 428, the NTF Vector is multiplied with the channel 1 STFT. At block 430, a residual vector is added, the residual being the difference between the reference channel convolved with the filter and the actual Nth channel signal. In an implementation, the CNN 420 or neural net architecture can be trained to minimize the difference between the output from this block 430 and the Ch.2 signal as one loss term, in addition to the ASR loss (for example, WER minimization). At block 432, a neural spatial encoder and neural residual encoder encodes spatial and spectral information into embedding vectors that are entropy coded and transmitted to the back-end.

In another implementation, the system is configured to process the spatial and spectral information to retain the aspects for specific audio features, for example, de-reverberation and de-noising.

Implementations as described herein are advantageously more accurate than first compressing MC audio, then decompressing the audio signal, and then executing spatial and spectral processing for the ASR. The system can be configured to jointly process the signals so that enhancement is not needed. The system provides spatial information to the ASR system.

For applications such as diarization, the system can retain the spatial information, which can be provided separately and done in a separate process. There are a number of applications where a neural RTF estimator can be deployed:

Multi Channel Audio Coding: as is described in the current disclosure, the neural RTF estimation can be used to extract the RTFs, which can be optionally, further compressed and transmitted to a back end, where they can be used to reconstruct a multi-channel audio signal or the RTFs could be directly input to an ASR model along with the reference channel (decoded or the raw encode bit stream).

Signal Enhancement: Estimated RTFs can be used in the formulation of the Minimum Variance Distortion less Response (MVDR) beamformer.

Direction Of sound Arrival estimation: a distribution of the coefficients of the RTFs provide information as to the location of the sound source in a room. Consider an anechoic chamber and a 4 channel microphone array. If a source if placed directly in front of the array, the 3 RTFs will be the same and this will indicate that the source is at 0 degrees (or in front) of the center of the array. Similarly, a machine learning system can be trained to learn the mapping between the shape of the RTFs across channels and the relative direction of the source. Accordingly, a further discussion of an RTF estimator is provided with respect to the implementations described in conjunction with FIGS. 5-11.

Training

Figure 5:
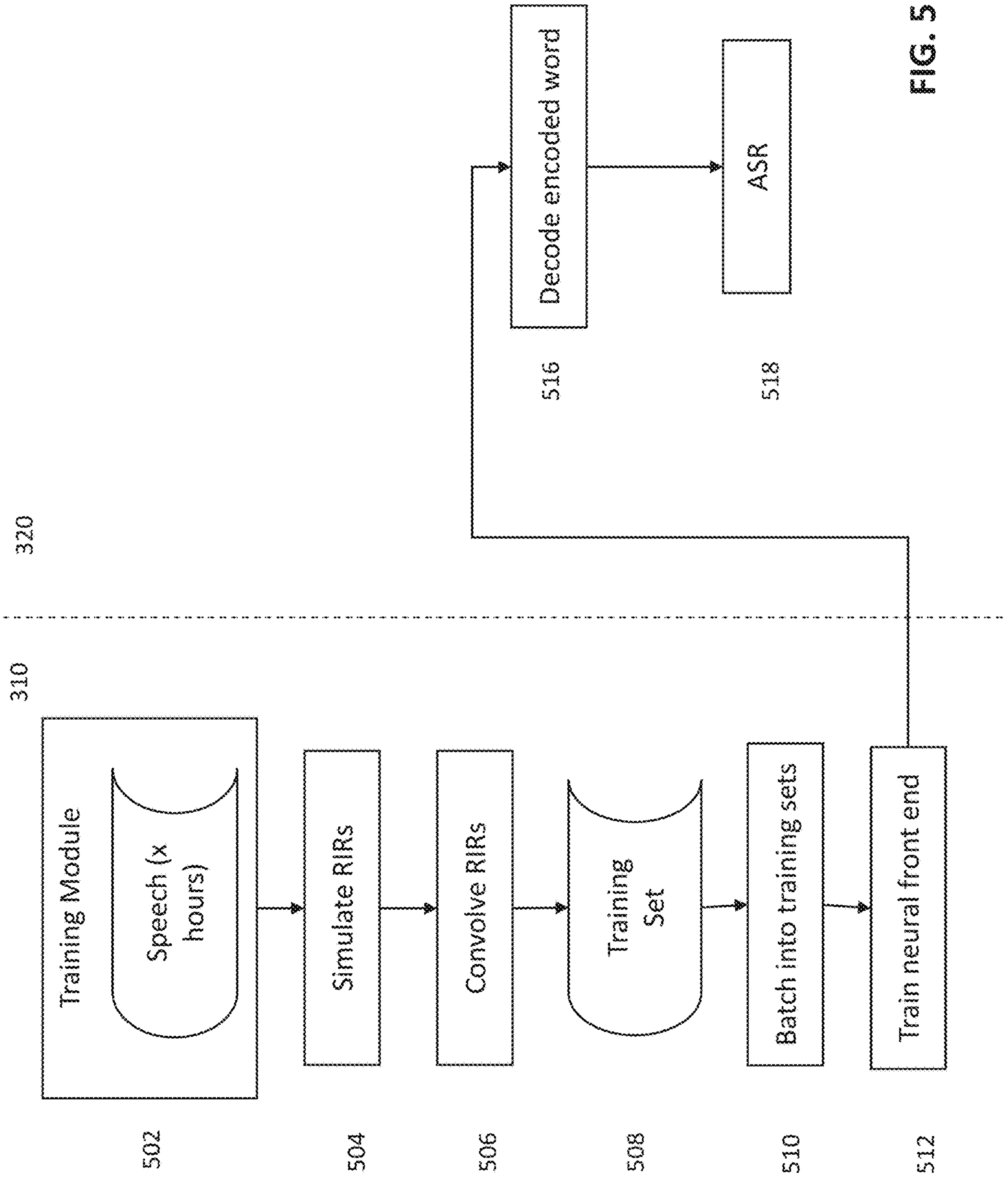
FIG. 5 describes a logical flow for training a Neural Front End.

FIG. 5 describes a logical flow for training a Neural Front End 310 including a RTF Neural Estimator, using a 2 channel example. At block 502, the training module trains on x hours of clean speech for a single channel, for example 1000 hours. In the example, taking each utterance at 1 minute long, 60,000 utterances in this set each utterance has a corresponding text transcript associated with the audio.

At block 504, a set of 2 channel RIRs (room impulse responses) can be obtained or simulated. For example, various room dimensions can be swept, obtaining reflection coefficients and positions of the sensors and speakers, resulting in 60,000 RIRs. As metadata, a dictionary of RTFs from these RIRs can be created, covering the combinations to be included in the RTF estimation (i.e. the standard RTF set and any additional reciprocity-based RTFs).

At block 506, a noise suppression filter estimator (NSFE) convolves the RIRs with the speech material to generate reverberant multi-channel audio to form the training set for the Neural Front end. In an implementation, the training set can be augmented with noise and level perturbations to generate a noisy and reverberant M channel audio. This forms the training set. As described herein, there are 6 speech examples per RIR and a dictionary of the associated RTFs, including the reciprocity ones.

At block 508 the data set is shuffled and at block 510 batched into mini batches for model training. For example, 10 utterances at a time can be mini-batched. In some implementations, the neural front end can consume time domain waveform samples. In another implementation, the neural front end can transform the set, for example, a frequency domain via a Short Time Fourier Transform (STFT).

At block 512, the neural front end 310 model is then trained, mini-batch at a time, with the aim of minimizing the error between the reconstructed signal (reference channel multiplied by the estimated filter plus residual vector {if in STFT domain}) and the channel 2 signal as well as the ASR loss term (WER minimization).

On a back end 320 module, at block 516 encoded code words are then decoded and at block 518 provided as input to an ASR engine (for example), whereby the overall loss is optimized by reducing the weighed sum of the ASR loss (for example, the WER) and the reconstruction loss (for example mean square error between reconstructed audio and original).

Reciprocity Enforcement

When studying the physics of acoustics, it is possible to derive a quantity known as a relative transfer function (RTF) which maps the signals of different microphones to each other, for example giving signal 2 after passing signal 1 though the mapping. The RTF depends on the room and the placement of the sources and microphones.

As such, by treating mappings as paths between microphones, according the physical principle of reciprocity, all paths from one specific microphone to another specific microphone should be equal. As such, path vectors can be obtained by combining smaller paths together.

Figure 6:
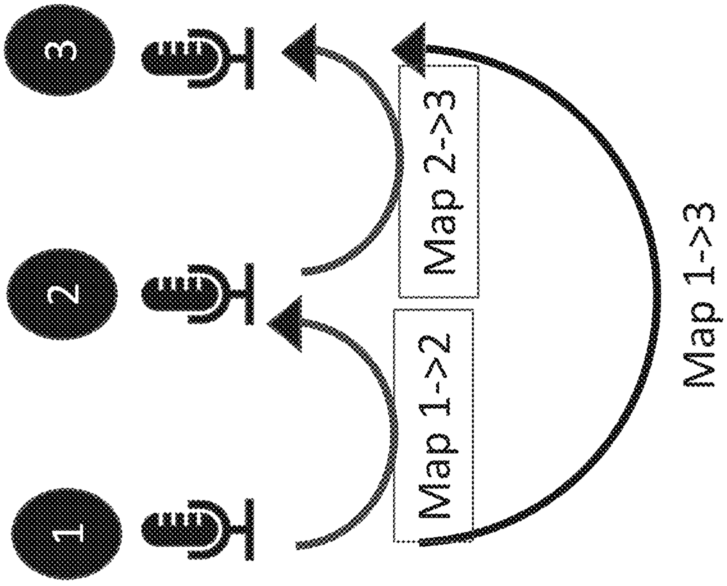
FIG. 6 shows an example relative transfer function (RTF) mapping.

For example, as shown in FIG. 6 the combination of (Map1→2 and Map2→3)=Map1→3 because they start at 1 and end at 3. This is a property of the physics of acoustics. Accordingly, the signal mapping can employ any technique that gives signal 1 from 2, and so on.

In conventional systems, when estimating these mappings, either using a neural network or an adaptive filter, this reciprocity property is not leveraged.

In an implementation, the neural network or filter is configured to be adapted so that the mappings satisfy reciprocity. By adding the structural features of reciprocity from the physics of acoustics to the mapping estimation, the mappings are advantageously more physically accurate. It is possible to add mathematical terms to the formulation of neural network and adaptive filters to this end. Depending on the arrangement of the microphones and the algorithms employed, thousands of paths may be equal to each other, which allow for a system to accurately represent the physics of the acoustic propagation.

Figure 7:
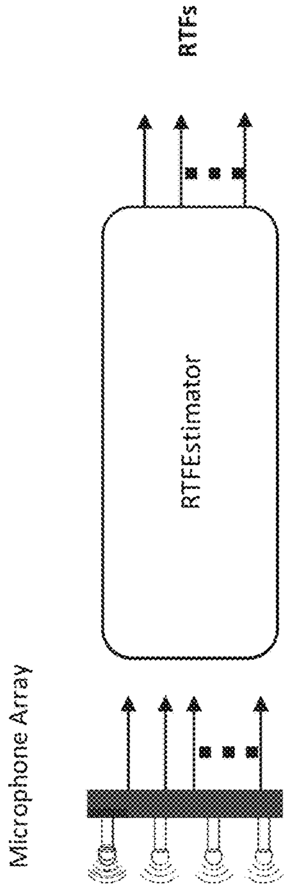
FIG. 7 shows a block diagram of an RTF Estimator Module.

FIG. 7 shows an example of a Neural RTF Estimator. As shown in FIG. 7 an M microphone array (M channels) input acoustic signals into the neural RTF estimator. The Neural RTF Estimator can comprise a Deep Neural Network (DNN) that estimates M−1 fixed length filters at a supported size from the M input speech signals. The loss function of the Neural RTF estimator is the sum of the errors in the reconstruction of a particular channel from a reference or other channel (i.e. ch. 2 from ch 1), convolved with an internal estimate of the RTF (for example, the RTF from ch1 to 2) as well as the error in the estimation of the RTF itself.

Figure 8:
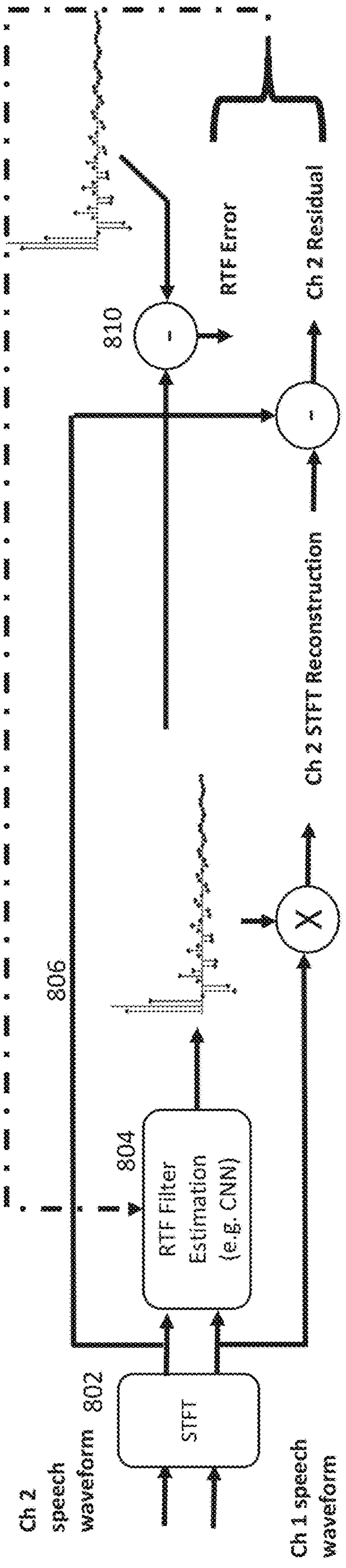
FIG. 8 describes a logical flow and architecture for an RTF Estimator Module.

FIG. 8 shows an example of a logical architecture and flow for a Neural RTF Estimator. As shown in FIG. 8, an exemplary 2 microphone array is input to the Neural RTF Estimator. At block 802, the system can optionally perform a Short Time Fourier Transform (STFT) of the input signals. At block 804, the STFT signals are passed to an RTF estimation module, which estimates a fixed length filter representing the RTFs from Ch1 to 2.

In an implementation, the system can be configured to compute a residual error. At block 806, during training, an estimated RTF is multiplied by the Ch1 signal (STFT in one encapsulation) to produce a reconstruction of the Ch 2 signal. As shown at block 808, the difference between the reconstructed Ch 2 signal and actual Ch 2 signal is the Ch. 2 residual error. At block 810, an RTF error is also computed between the estimated RTFs and actual RTFs. The RTF estimator is configured to attempt to minimize Ch 2 error and the RTF error, each of which is multiplied by a weight to give more or less importance to the RTF estimation error or the Ch 2 residual error. The RTF error and the residual error together can advantageously provide regularization for the neural network. For example, if only the RTF error is retained, the neural network configuration could determine that only a few high energy coefficients need to be estimated correctly, resulting in a poor reconstruction of the Ch2 signal. Accordingly, the RTF estimation module is advantageously configured to compute and weight the Ch 2 error and the RTF error as described herein.

The residual error can also be weighted to give different importance to different STFT coefficients. Similarly, the RTF error coefficients may be weighted to achieve a similar effect.

In an implementation, the RTF estimator can be configured to estimate the filters without computing the RTF error.

Returning to FIG. 7, an M microphone array includes a plurality of channels is described. In the following example, the microphone array has more than two channels (M>2). The neural network RFT estimator processes the M input signals and estimates M−1 fixed length filters representing the RTFs from Ch1 to 2, 1 to 3 and 1 to M.

For any additional microphone channels, additional constraints can be placed on the physical properties of the estimated RTFs. Additional loss term(s) that satisfy the reciprocity property of the RTFs are added. The system can be configured to employ a number of processes to incorporate additional reciprocity properties. One process can include Derived Reciprocity, where the system includes additional reciprocity-based constraints in the cost function of the RTF estimator neural network to 'derive' the additional RTFs from the M−1 RTFs estimated by the RTF estimator neural network. Another process is Integrated Reciprocity, where the system includes additional reciprocity-based constraints in the cost function of the RTF estimator neural network to 'integrate' the estimation of additional RTFs into the RTF estimator neural estimator itself. The neural RTF estimator can be configured to estimate Mi>M−1 RTFs.

Figure 9:
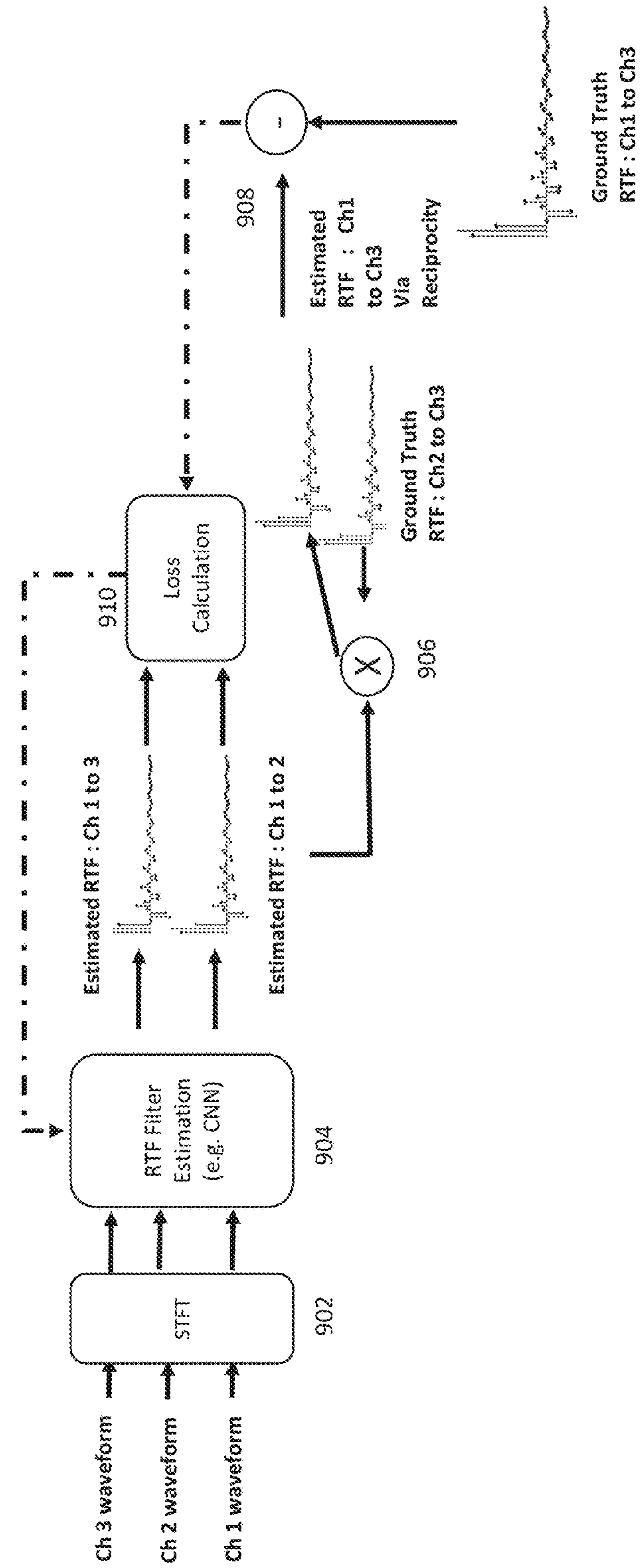
FIG. 9 describes a logical flow and architecture for an RTF Estimator Module.

FIG. 9 shows an example of a logical architecture and flow for a Neural RTF Estimator configured for Derived Reciprocity. As shown in FIG. 9, the system is configured for an exemplary 3 microphone array. At block 902, the system can optionally perform a Short Time Fourier Transform (STFT) of the input signals. At block 904, the STFT signals are passed to an RTF estimation module, which estimates 2 fixed length filters representing the RTFs from Ch1 to Ch2 and Ch1 to Ch 3. At block 906, an additional RTF from Ch2 to Ch3 is added to the loss function by multiplying an estimated RTF from Ch1 to Ch2 (as estimated by the Neural RTF Estimator) by a ground truth RTF from Ch2 to Ch3 (obtained from training data labels) to obtain a reciprocity-based estimate of the RTF from Ch 1 to Ch 3. At block 908, the reciprocity-based estimate of the RTF from Ch1 to Ch3 is compared with a ground truth RTF from Ch1 to Ch3 to generate an error term. At block 910, an error term is added to the loss calculation after being weighted appropriately to the normal loss calculation.

Accordingly, in FIG. 9, an additional reciprocity-based constraint is derived and added to the DNN loss calculation described with respect to the 2 channel example of FIG. 8. It will be appreciated that for even larger arrays, additional reciprocity-based constraint can be similarly added.

Figure 10:
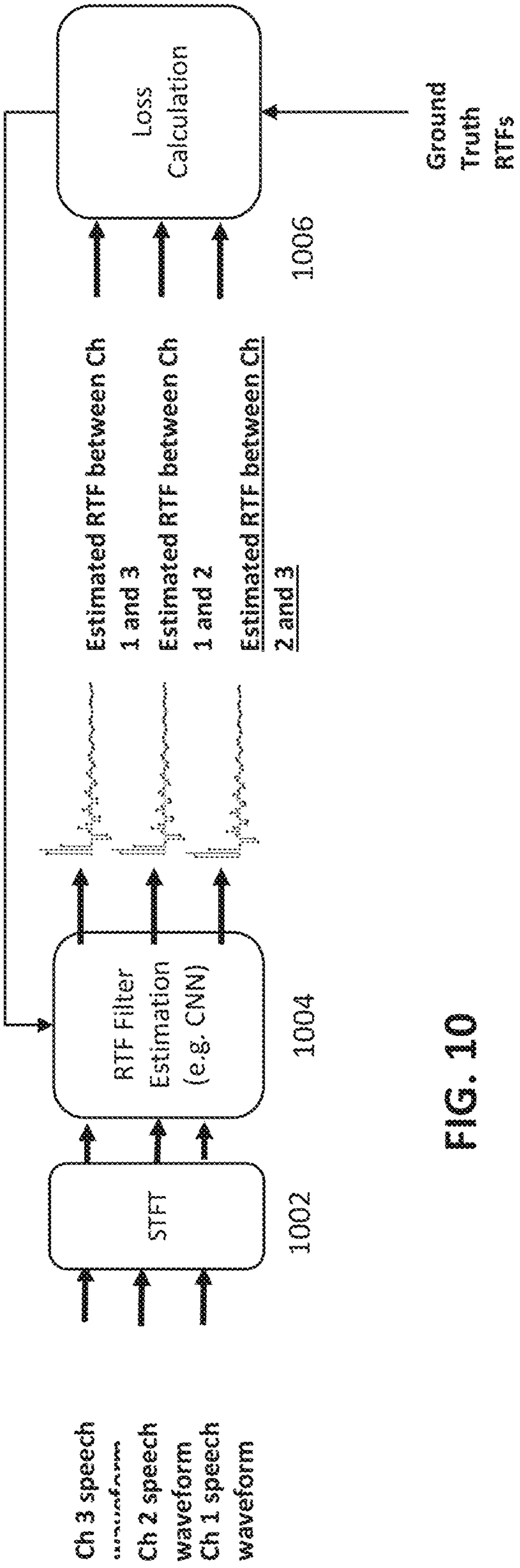
FIG. 10 describes a logical flow and architecture for an RTF Estimator Module.
Figure 11:
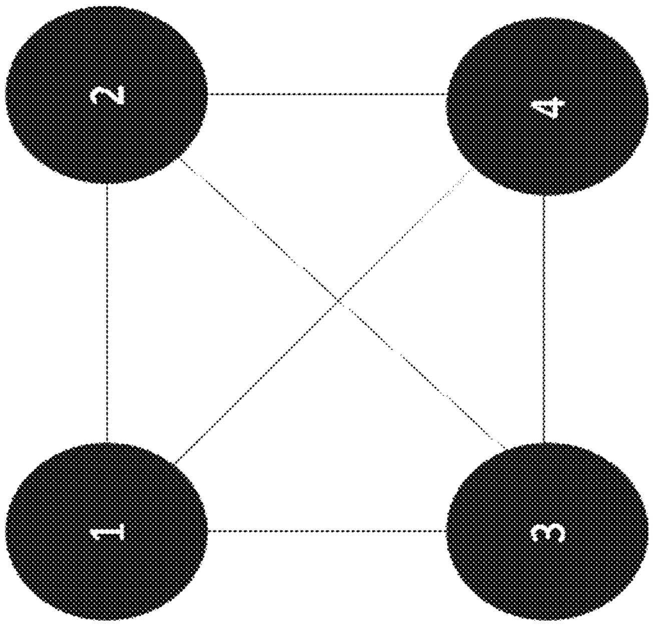
FIG. 11 shows an example graph for relative transfer function (RTF) mapping.

FIG. 10 shows an example of a logical architecture and flow for a Neural RTF Estimator configured for Integrated Reciprocity. As shown in FIG. 10, the system is configured for an exemplary 3 microphone array. At block 1002, the system can optionally perform a Short Time Fourier Transform (STFT) of the input signals. At block 1004, the STFT signals are passed to an RTF estimation module, which estimates which estimates 3 fixed length filters representing the RTFs from Ch1 to Ch2, Ch2 to Ch3 and Ch1 to Ch3. An additional RTF from Ch2 to Ch3, representing one additional reciprocity constraint, is also added. The estimation of additional RTFs being included explicitly in the modeling is an integrated reciprocity approach. As such, the loss function is simply expanded to include the extra RTF.

As shown in the exemplary embodiment of FIG. 10, at block 1006, an additional reciprocity-based constraint is added to the DNN loss calculation. It will again be appreciated that for even larger arrays, additional reciprocity-based constraints can be similarly added. The present disclosure thus supports implementations including a subset of added constraints in the RTF estimation process.

In an implementation, the system can be configured to estimate a number of RTFs between a number of channel pairs as described herein using conventional signal processing technology, for example by using adaptive filters, and then train a DNN. The DNN can then be trained to accept an input of a number of RTFs obtained by conventional signal processing and combine the RTF into a single, more accurate RTF using the reciprocity processing described herein.

Reciprocity

Equation 1 shows how all Relative Transfer Functions (RTFs) can be expressed in terms of room impulse responses. Another property that must be true for the correct RTFs is that they must be 'reciprocal'. Mathematically this can be expressed as follows. For an M channel microphone array.

$$W_{rm}(n,k)=\frac{H_r(n,k)}{H_m(n,k)}\text{ for } m=\{1,M\},\ r=\{1,M\},\ r6=m$$

The relationship for reciprocity is expressed as:

$$W_{rm}(n,k)=W_{rl}(n,k)W_{lm}(n,k)\quad\text{for}\quad m=\{1,M\},\ r=\{1,M\}, r\,6=m\,6=l \tag{1}$$

This expresses a first order reciprocity relationship' in that, when considering the path of the transfer functions, there is one intermediate microphone. This can be extended to include M−2 intermediate microphones and could omit different microphones as chosen by the engineer. This can provide a defined set of constraints that can be used in adaptive algorithms or in the errors of neural networks during training.

To further analyse this property, a predictive coding array network can be presented as a graph. As will be appreciated, this array network has not been previously applied to RTFs. In a 4 channel uniform linear array (ULA), the array can be expressed as a graph like the one shown in FIG. 11.

The vertices of the graphs represent the signals at the microphones and the edges of the graphs represented the relative transfer functions, which can be estimated. A path is defined as any combination of edges that connects a source vertex to a destination vertex without repeating edges or vertices.

The number of paths from a source to a destination is given by:

$$N_p=(N_M-1)! \tag{2}$$

Where $N_m$ denotes the number of vertices, which in our application of interest is the number of microphones. The number of source and destination combinations is given by:

$$N_{SD}=N_m(N_m-1) \tag{3}$$

For an 8-channel array this means there are 7!=5040 paths which can be divided into groups of 8*7=56 constraints for each source-destination pairing If all RTFs are known the graph is both bi-directional, meaning that the edges are different in each direction, and it is complete, meaning all vertices (microphones) are connected by an edge (which works if we know all RTFs), then it is not possible to find all paths analytically as this would result in an infinite loop.

In order to overcome this problem one must use a depth first search to iteratively discover paths that satisfy the constraints. This is quite computationally expensive for larger graphs, but for arrays is not unreasonable and can be conducted before hand by knowing the topology of the graph which is related to the number of RTFs being estimated and the order of the path, where the order is equal to the number of vertices that are used in the path other than the source and destination.

When this search is performed it is then possible to group paths that share the same source and destination. This can be used to calculate a term that may be added to the cost function or adaptation stage of a neural network or adaptive filter respectively. For example take the case of the paths from vertex 1 to 2 in FIG. 11. The notation Rx denotes the edge between vertices x and y. Applied to microphone array coding, this can represent a time-frequency bin of an RTF or a mapping between embeddings in a neural network. It is clear to see that:

$$P1=R12$$

$$P2=R13R32$$

$$P3=R14R42$$

$$P4=R13R34R42 \tag{4}$$

A cost term for a source/reference mic rand destination/encoded mic m J could be formulated using either matrix notation or a summation as follows:

$$P=\begin{bmatrix} P_1 & P_2 & P_3 & P_4 \\ P_1 & P_2 & P_3 & P_4 \\ P_1 & P_2 & P_3 & P_4 \\ P_1 & P_2 & P_3 & P_4 \end{bmatrix} \quad M \quad M \tag{5}$$

$$J_{path}=\mathrm{sum}(U|P-P^T|)={}^{XX}|P_p-P_q| \quad p \quad q \tag{6}$$

Where U is a matrix with 1s in the upper triangular and the modulus operator applied to a matrix operates element by element. This can then be extended to condition all the RTFs/mappings by simply summing over different source and destination combinations. The cost could be tuned by including or omitting certain paths. Where $N_p$ indicates the number path (source destination pair) under consideration, the reciprocity cost can be calculated by summing the cost function of the paths:

$$J_{recip.}=\sum_{n}^{N_P} J_{path,n} \tag{7}$$

In practical cases it is unlikely that all the RTFs will be estimated, but in this case the topology of the graph can simply be adjusted accordingly and the number of terms being summed in the cost function will decrease. The number of paths can still be discovered using the depth first search.

Benefits

The benefit of a neural network or an adaptive filter to implement reciprocity is that it enforces reciprocity more accurately to represent physics of the acoustic propagation, which can be beneficial in both overall accuracy but also in constraining neural networks during their training. It may also have benefits for stability and training speed as more information is provided for the optimization.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A speech processing system comprising:

a first microphone that captures first audio from a first spatial zone, and produces a first audio signal;

a second microphone that captures second audio from a second spatial zone, and produces a second audio signal;

a processor that receives the first audio signal and the second audio signal; and a memory that contains instructions that control the said processor to perform operations of:

(a) a front end module comprising:

a neural spectral encoder that encodes a reference channel and outputs a spectral embedding vector; and a neural spatial and residual encoder (NSRE) that accepts as inputs the spectral embedding vector and one or more of: the first audio signal and the second audio signal, the NSRE processing the inputs to output Neural Transfer Functions (NTFs); and (b) a back end module comprising:

an automatic speech recognition (ASR) decoder that recognizes an utterance using the spectral embedding vector and the NTFs.

2. The system of claim 1, wherein the back end module further comprises:

a neural spatial decoder, a residual decoder; and a spectral decoder.

3. The system of claim 2, wherein the ASR decoder to receives and decodes outputted decoded multi-channel signals from the neural spatial decoder, the residual decoder, and the spectral decoder.

4. The system of claim 2, wherein the back end module further comprises:

an information aggregator configured to receive outputted decoded multi-channel signals from each of the neural spatial decoder, the residual decoder, and the spectral decoder; and wherein the information aggregator outputs the outputted decoded multi-channel signals to the ASR decoder.

5. The system of claim 1, wherein the NSRE comprises a convolutional neural network (CNN).

6. The system of claim 1, further comprising:

a neural spatial Relative Transfer Function (RTF) estimator that estimates a residual vector; and a neural embedding encoder that encodes an RTF estimation criterion and the residual vector into a neural embedding, the neural embedding encoder allocating a density to compress the residual vector in the neural embedding, wherein the neural embedding encoder is separate from the NSRE.

7. The system of claim 6, wherein the neural spatial RTF estimator comprises a Deep Neural Network (DNN) that estimates M−1 filters from M input speech signals.

8. The system of claim 7, wherein the M−1 filters represent RTFs from (i) channel 1 to channel 2, (ii) channel 1 to channel 3, and (iii) channel 1 to channel m.

9. The system of claim 6, wherein the front end module further computes RTFs by:

obtaining a set of two channel room impulse responses (RIRs); and estimating the RTFs from the RIRs, the estimated RTFs including reciprocity-based RTFs.

10. The system of claim 9, wherein the first microphone and the second microphone are included in a three-microphone array, the NSRE further performing:

estimating, by the neural RTF estimator, two filters representing RTFs from channel 1 to channel 2 and channel 1 to channel 3; and obtaining a reciprocity-based estimate of the RTF from channel 1 to channel 3 by adding an additional RTF from channel 2 to channel 3 to a loss function, the additional RTF being determined by multiplying the estimated RTF from channel 1 to channel 2 by a ground truth RTF from channel 2 to channel 3, the additional RTF being a derived reciprocity-based RTF.

11. The system of claim 10, the NSRE further performing:

generating an error term by comparing the reciprocity-based estimate of the RTF from channel 1 to channel 3 with a ground truth RTF from channel 1 to channel 3; and adding the error term to the loss function.

12. The system of claim 1, wherein the NSRE comprises:

a spectral decoder that processes the first audio signal;

a Short Time Fourier Transform (STFT) that transforms the processed first audio signal by the spectral decoder and the second audio signal;

an estimate Finite Impulse Response (FIR) filter that processes output from the STFT into a NTF vector, wherein the NTF vector is multiplied with channel 1 STFT and a residual vector is added producing an output; and a spatial and residual encoder that encodes spatial and spectral information in the output into embedding vectors, the embedding vectors being entropy coded and transmitted to the back end module.

13. A method comprising:

receiving, by a first computing device, an audio signal from a microphone array;

encoding, by the first computing device, the audio signal into an encoded audio signal;

executing, by the first computing device, a front end module to:

encode, using a neural spectral encoder, a reference channel stream and output a spectral embedding vector; and process, using a neural spatial and residual encoder (NSRE), the spectral embedding vector and the encoded audio signal into spatial embedding vectors and residual embedding vectors, the spectral embedding vector having a spectral encoded reference channel stream; and providing the spectral embedding vector, the spatial embedding vectors, and the residual embedding vectors to a back end module executing in a second computing device different from the first computing device for performing automatic speech recognition (ASR).

14. The method of claim 13, wherein the microphone array includes a three-microphone array, the method further comprising:

estimating, by a neural Relative Transfer Function (RTF) estimator included in the NSRE, two filters representing RTFs from channel 1 to channel 2 and Channel 1 to channel 3; and obtaining a reciprocity-based estimate of the RTF from channel 1 to channel 3 by adding an additional RTF from channel 2 to channel 3 to a loss function, the additional RTF being determined by multiplying the estimated RTF from channel 1 to channel 2 by a ground truth RTF from channel 2 to channel 3, the additional RTF being a derived reciprocity-based RTF.

15. A speech recognition system comprising:

a microphone that captures audio from a spatial zone, and produces an audio signal; and a first computing device that receives the audio signal and encodes the audio signal into an encoded audio signal, the first computing device comprising a front end module comprising:

a neural spectral encoder that encodes a reference channel stream and outputs a spectral embedding vector; and a neural spatial and residual encoder (NSRE) that accepts as inputs the encoded audio signal and the spectral embedding vector, the spectral embedding vector having a spectral encoded reference channel stream, the NSRE processing the inputs to output spatial embedding vectors and residual embedding vectors, wherein the first computing device provides the spectral embedding vector, the spatial embedding vectors, and the residual embedding vectors to a back end module executing in a second computing device different from the first computing device for performing automatic speech recognition (ASR).

16. The system of claim 15, wherein the front end module further comprises a Neural Spatial Relative Transfer Function (RTF) estimator that estimates a filter and a residual vector.

17. The system of claim 16, wherein the front end module further comprises a neural embedding encoder that encodes an RTF estimation criterion and the residual vector into a neural embedding, the neural embedding encoder allocating a density to compress the residual vector in the neural embedding.

18. The system of claim 17, wherein the neural embedding encoder is separate from the NSRE.

19. The system of claim 16, wherein the neural spatial RTF estimator comprises a Deep Neural Network (DNN) that estimates M−1 filters from M input speech signals.

20. The system of claim 15, wherein the NSRE comprises a convolutional neural network (CNN).

* * * * *